United States Patent

[11] 3,578,303

[72] Inventor John P. Fullam
 Baie O'Urfe, Quebec, Canada
[21] Appl. No. 812,652
[22] Filed Apr. 2, 1969
[45] Patented May 11, 1971
[73] Assignee Abex Industries of Canada Ltd.
 Montreal, Quebec, Canada

[54] OLEO-PNEUMATIC SHOCK ABSORBERS
 8 Claims, 4 Drawing Figs.
[52] U.S. Cl. .................................................... 267/64
[51] Int. Cl. ...................................................... F16f 5/00
[50] Field of Search ............................................ 267/64 (V),
 64 (A), 34

[56] References Cited
 UNITED STATES PATENTS
 3,077,345 2/1963 Anderson et al. .............. 267/64
 3,147,826 9/1964 McHenry ...................... 267/64

Primary Examiner—James B. Marbert
Attorney—Wood, Herron & Evans

ABSTRACT: A two-stage oleo-pneumatic shock absorber incorporating an overload relief valve for instantaneous damping of transient loads. A cylindrical oil chamber is separated by a movable orifice plate into high- and low-pressure stages which are connected by a hollow metering pin passing through the orifice. The relief valve comprises a high-pressure air chamber separated from the oil in the high-pressure stage by an annular floating piston which encircles and normally covers large holes in the metering pin. When a transient load increases the oil pressure in the shock absorber, the floating piston moves, compresses the air, uncovers the holes and "dumps" high-pressure oil down the hollow metering pin to the low-pressure side of the orifice plate.

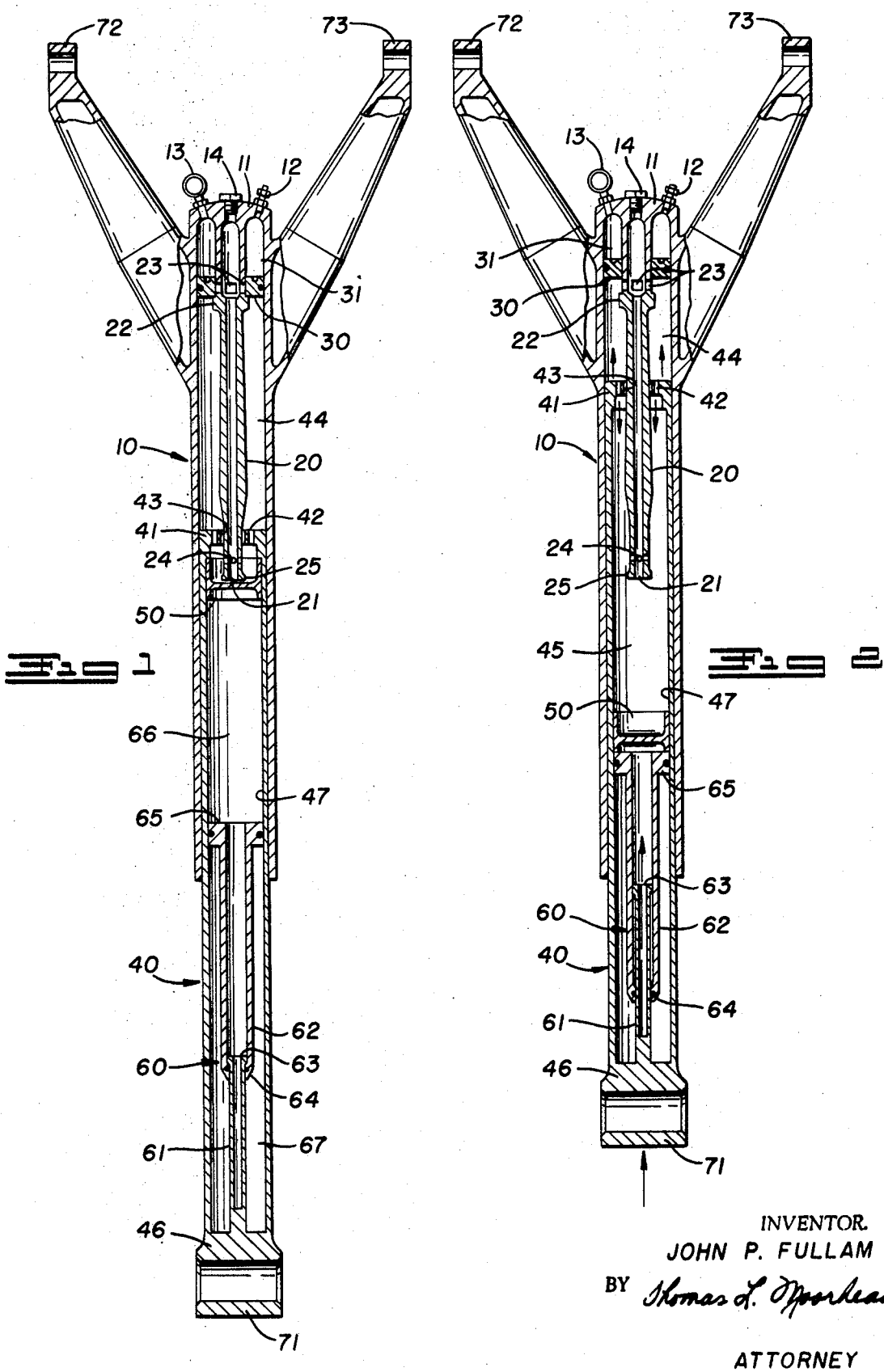
Patented May 11, 1971
3,578,303
2 Sheets-Sheet 1
INVENTOR.
JOHN P. FULLAM
BY Thomas L. Moorhead
ATTORNEY Patented May 11, 1971

INVENTOR.
JOHN P. FULLAM

BY Thomas L. Moorhead

ATTORNEY

OLEO-PNEUMATIC SHOCK ABSORBERS

BACKGROUND OF THE INVENTION

This invention relates to a shock absorber for a vehicle. More specifically, this invention relates to an improvement in shock absorbers of the oleo-pneumatic type wherein a novel overload relief valve is provided which enhances the working characteristics of the shock absorber. Shock absorbers of this category are known and have proved to function particularly well for use in the shock strut of an aircraft. See U.S. Pat. No. 2,959,410 in which the instant inventor is named as coinventor of a related shock absorber.

A disadvantage in all shock absorbers of this general type has been that high transient loading or vertical shocks cannot be compensated for rapidly enough and are transferred to the vehicle or aircraft structure. Attempts have been made to compensate for such overloading. For example, coil spring-loaded relief valves have been used which vent oil when excessive fluid pressures are created in the oil chamber. But such relief valves are necessarily limited structurally. Furthermore, the use of coil springs is disadvantageous because their inherent weight and inertia undesirably limits the speed of dynamic response.

SUMMARY

This invention comprises a shock absorber of the oleo-pneumatic type comprising a cylindrical oil chamber separated by a movable orifice plate into high- and low-pressure chambers, with a hollow tapered metering pin passing through the orifice plate to provide a fluid passageway connecting the high- and low-pressure chambers, and incorporating a relief valve which comprises a high-pressure air chamber separated from the high-pressure oil chamber by an annular, movable piston which encircles the hollow metering pin, normally covering large holes in its side, whereby an increase in the pressure in the high-pressure oil chamber caused by transient loading is relieved by compression of the air behind the floating piston and dumping of high-pressure oil through the large holes uncovered thereby.

An object of this invention is, therefore, the provision of an oleo-pneumatic shock absorber capable of reducing undesirable effects of vertical loading and which prevents the transfer of high transient loads to the vehicle structure.

A further object of this invention is to provide a shock absorber of the oleo-pneumatic type which incorporates a novel relief valve having a reactive surface sufficiently large to reflect overload conditions and in response provide instantaneous damping of a transient load.

Another object of this invention is the provision in a shock absorber of the oleo-pneumatic type of a relief valve having a minimal weight and inertia and therefore capable of a rapid dynamic response to a transient load.

Other objects and features of the invention will become more important from a consideration of the following description, reference being made to the accompanying drawings, wherein a preferred form of the present invention is clearly shown.

In the Drawings

FIG. 1 is an elevational view, partially in cross section of a shock absorber incorporating the features of this invention shown in a fully extended position of the shock absorber.

FIG. 2 is an elevational view, partially in cross section, illustrating the shock absorber of FIG. 1 in partially collapsed position.

GENERAL CONSTRUCTION

Figure 3:
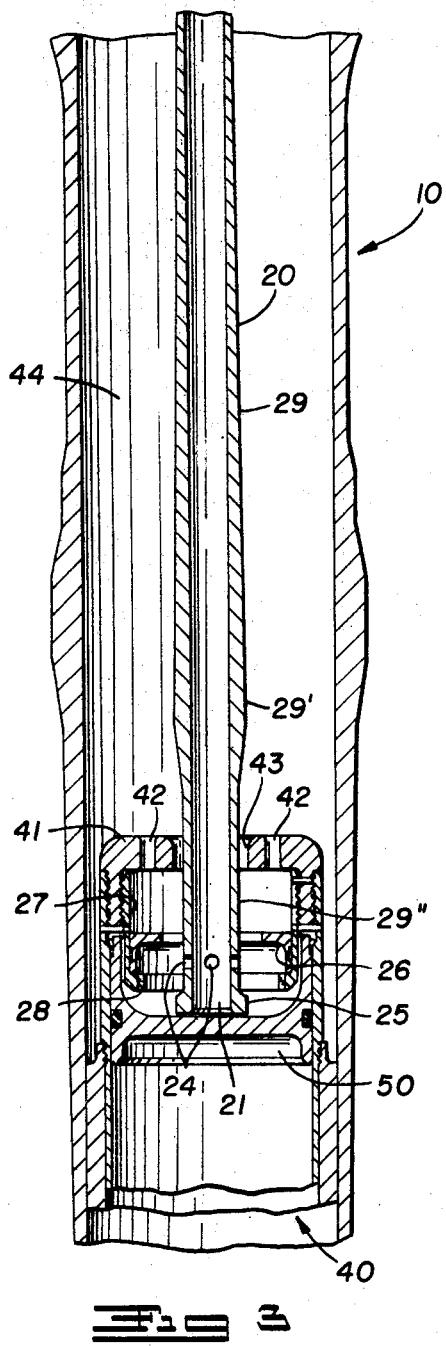
FIG. 3 is an enlarged view of a portion of the shock absorber illustrated in FIGS. 1 and 2 and illustrating details of the metering pin and orifice.

In this invention, in FIG. 1, there is illustrated a shock absorber of the oleo-pneumatic type that is adapted to be placed between the sprung mass and the unsprung mass of a vehicle, or more particularly, between the landing gear and fuselage of an aircraft.

The shock absorber consists of a pressure cylinder 10 closed at its upper end by an integral closure 11. A hollow metering pin 20 is centrally attached to the closure 11 and extends with its open end 21 downwardly into cylinder 10. An annular floating piston 30 forms an air chamber 31 with cylinder 10, closure 11 and metering pin 20. Air chamber 31 may also be referred to as an air spring. Piston 30 normally rests against flange 22 of pin 20 and the radially inner surface of piston 30 covers orifices 23 in the side of metering pin 20. Orifices 23 are made as large as possible to facilitate rapid transfer or "dumping" of liquid. Orifices 24 are formed in the sides of the pin at its open end.

An axially movable cylindrical piston 40 is telescoped into the cylinder 10 and its upper end is closed by a plate 41 containing a plurality of orifices 42. A central orifice or hole 43 in plate 41 permits the passage of metering pin 20. The lower end of metering pin 20 terminates in an annular flange 25.

A second floating piston 50 which is axially movable in cylindrical piston 40 forms with cylinder 10, piston 30, pin 20 and piston 40 a chamber which contains a conventional hydraulic liquid which will be referred to as the oil. As can be seen, orifice plate 41 separates the oil chamber into two interconnected chambers while will be referred to as high-pressure chamber 44 and low-pressure chamber 45.

The lower end of cylindrical piston 40 is closed by an integral closure 46. The inner member 61 of a telescoping stack tube 60 is centrally attached to closure 46. The outer member 62 telescopes with and extends upwardly from inner member 61. Mutually engaging flanges 63 and 64 act as stops to prevent the runoff of member 62 form member 61.

To the upper end of stack tube member 62 is attached annular piston 65 which moves axially in contact with the inner surface 47 of cylindrical piston 40. Therefore, two separate air chambers are formed. A first air chamber 66 is formed by stack tube 60, piston 50, piston 65 and cylindrical piston 40. And a second air chamber is formed by stack tube 60, closure 46, piston 65 and cylindrical piston 40.

For operation, air chamber 66 is filled with air at a pressure which is low relative to a higher pressure in air chamber 67. For example, air chamber 66 may be at 150 p.s.i. while air chamber 67 is at 1,2000 p.s.i. Both chambers are filled with air through separate valves which are not shown. Chamber 31 is charged with air at high pressure, e.g. 1,600 p.s.i., through air-charging valve 12. An air-pressure gauge 13 is also provided. Oil can be added to chambers 44 and 45 through hollow metering pin 20 by way of the oil-filler plug 14 in closure 11.

The shape of metering pin 20 is selected to effect the desired damping characteristics. See FIG. 3. In the mode illustrated, the dimensions of the pin vary from an intermediate diameter at 29, to a greater diameter near the center at 29', with the smallest diameter at 29".

A valve is provided to control the flow of oil into chamber 44 from chamber 45. Valve 26 is constructed such that it is axially movable within cylinder 27 which is attached to the radially inner wall of piston 40. Flange 28 limits the downward travel of valve 26.

Lug 71 is provided for connecting the shock absorber to the wheels of the aircraft. Lugs 72 and 73 are provided for attachment of the shock absorber to the fuselage of the aircraft.

OPERATION

In the landing of the aircraft, the load is applied to member 71 which causes piston 40 to telescope into cylinder 10 as illustrated in FIG. 2. Orifice plate 41, which is attached to piston 40, moves upward into cylinder 10 causing an increase in the pressure of the oil in high-pressure chamber 44. Fluid will flow from high-pressure chamber 44 to low-pressure chamber 45 through orifices 42 and through hole 43 around the metering pin 20. This restriction of the oil flow through the orifices and around the metering pin effects a damping action.

As the oil flows from high pressure chamber 44 to low pressure chamber 45 the increasing pressure in chamber 45 will act against floating piston 50. This in turn compresses the air in low-pressure air chamber 66 which is caused to contract.

When the air in chamber 66 has been compressed to the extent that either the pressure in chamber 66 is the same as the pressure in chamber 67 or piston 50 comes to rest against piston 65, further expansion of chamber 45 causes downward movement of piston 65 and, therefore, a contraction of chamber 67. Hence the air in chamber 67 is further pressurized.

Figure 4:
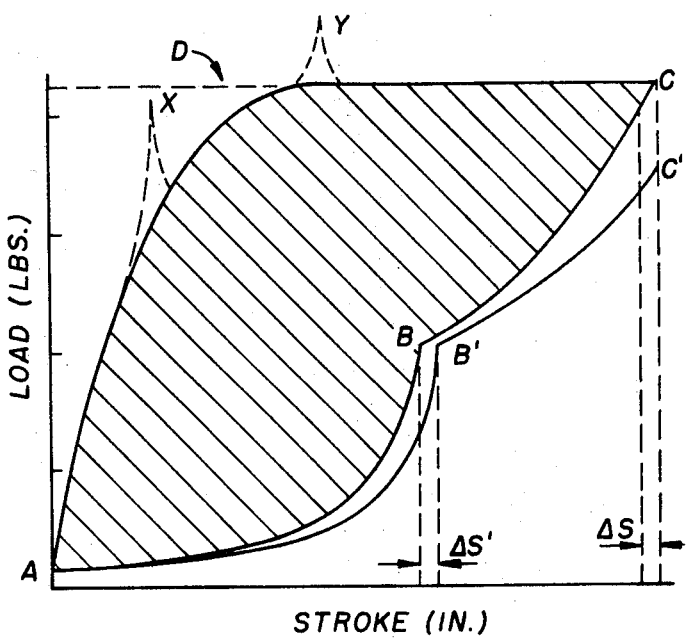
FIG. 4 is a diagram graphically illustrating the static and dynamic characteristics of the shock absorber of this invention.

The normal operation of the shock absorber is graphically illustrated in FIG. 4. During very slow static loading the shock absorber contracts according to the curve AB'C'. This static damping is achieved by storing energy in the air chambers 66 and 67 and is thoroughly discussed in the specification of U.S. Pat. No. 2,959,410 which was referred to previously.

The dynamic response of the shock absorber of this invention is quite different from the response under static loading conditions. First, because of the generation of heat in the dynamic mode there is more load absorbed per unit of stroke. Therefore the function of the air springs or chambers 66 and 67 if offset by a distance $\Delta S'$ and the damping follows curve ABC. The small increment of stroke $\Delta S$ is provided to avoid bottoming of the pistons in the air chambers.

Also, the rapid passage of liquid through orifices 42 and through the metering valve comprising pin 20 and orifice 43 provide an additional damping effect which is shown in the shaded portion above the curve ABC. The shape of this area varies in accordance with the shape of the metering pin and the optimum design will produce a straight line such as is shown at D.

When landing gear contacts a rough rear such as a hole in the landing surface, a sharp, sudden transient load such as shown at X or Y in FIG. 4 will occur. If only a small portion of the stroke has been used, such as at X, the transient load will be within the capacity of the device and will be absorbed. The reason for this is that the air springs of chambers 66 and 67 have not been fully compressed and the smallest diameter 29'' of the metering pin 20 is in orifice 43 which permits a more rapid transfer of oil from chamber 44 to chamber 45. If the transient load is applied when more of the available stroke has been used, such as at Y, the shock absorber can not absorb the transient load. Without some additional damping means the load is transferred to the unsprung mass or the fuselage of the aircraft.

The overload relief valve formed by piston 30, air spring 31 and orifices 23 effectively prevents this transfer of the transient load to the fuselage. When a transient load is applied to orifice plate 41 through piston 40 and member 71, the pressure in chamber 44 increases sharply. Depending on the position of metering pin 20 in its orifice 43 and the size of the transient load, the rate of passage of oil through metering orifice 43 may increase. This same sharp increase in pressure in chamber 44 also acts upon the piston 30 which has substantially the same surface area exposed to the oil as does orifice plate 41. The pressure in chamber 44 will act on piston 30 to move the piston by compressing the air behind it, uncovering the large orifices 23 and allowing high-pressure oil to flow down the center of hollow metering pin 20 to the low-pressure chamber 45. The load is thus absorbed by two additional means: first by the damping or the direct spring action of piston 30 moving against the compressed air in chamber 31; and second by the dumping or rapid transfer of the high-pressure oil through the orifices 23. This has the effect of preventing high transient loads from being transferred to the aircraft structure.

While the embodiments of the present invention as herein disclosed constitute preferred forms, it is to be understood that other forms might be adopted.

I claim:

1. In a shock absorber comprising an oil chamber separated into high- and low-pressure sections by a movable annular piston, a metering valve comprising a hollow metering pin within the chamber passing through the orifice in the piston, and means for applying a load to the piston, the improvement which comprises:
   orifices in the hollow metering pin which are normally closed by a second independently movable annular piston separating the high-pressure oil chamber section from an air chamber, whereby an increase in the pressure in the high-pressure oil chamber section caused by a transient load will be instantaneously damped by the cooperation of the flow of oil through the metering valve, the compression of the air behind the second annular piston, and a rapid transfer of oil into the metering pin orifices uncovered by the movement of the second annular piston and through the hollow metering pin to the low-pressure section.

2. The shock absorber described in claim 1 which further comprises an air spring means for absorbing a portion of the applied load.

3. The shock absorber described in claim 1 which further comprises a plurality of air spring means for absorbing a portion of the applied load.

4. A shock absorber of the oleo-pneumatic type comprising:
   an oil chamber,
   a movable first piston separating the oil chamber into high- and low-pressure section,
   means for applying a load to the first piston,
   an orifice in the first piston,
   a hollow tapered metering pin in the chamber which passes through the orifice to form a metering valve,
   holes formed in the hollow metering pin,
   an air chamber separated from the high-pressure section by an independently movable annular second piston which normally closes the holes,
   whereby an increase in the pressure in the high-pressure section caused by a transient load will be instantaneously absorbed by the damping flow of oil through the metering valve, by the compression of the air in the air chamber brought about by displacement of the annular second piston, and by the rapid transfer of oil into the holes in the metering pin and through the hollow metering pin to the low-pressure section.

5. A shock absorber, as defined in claim 4, wherein a second air chamber is separated from the low-pressure section by a movable third piston.

6. A shock absorber, as defined in claim 5, wherein a third air chamber is separated from the second air chamber by a movable fourth piston.

7. A shock absorber, as defined in claim 4, wherein additional fixed orifice means are formed in the first piston.

8. A shock absorber, as defined in claim 7, wherein there is provided valve means for controlling the flow of oil through the additional fixed orifice means.

PO-1050
(5/69)

UNITED STATES PATENT OFFICE
CERTIFICATE OF CORRECTION

Patent No. 3,578,303        Dated May 11, 1971

Inventor(s) John P. Fullam

It is certified that error appears in the above-identified patent and that said Letters Patent are hereby corrected as shown below:

Column 1, line 57, change "important" to -- apparent --.

Column 2, line 31, change "while" to -- which --.

Column 2, line 38, change "form" to -- from --.

Column 2, line 50, change "1,2000" to -- 1,200 --.

Column 2, line 61, after "valve", add -- 26 --.

Column 3, line 28, change "if" to -- is --.

Column 3, line 38, change "rear" to -- area --.

Column 4, line 38, change "section" to -- sections --.

Signed and sealed this 26th day of October 1971.

(SEAL)
Attest:

EDWARD M.FLETCHER,JR.        ROBERT GOTTSCHALK
Attesting Officer        Acting Commissioner of Patents